Patented Aug. 4, 1942

2,292,315

UNITED STATES PATENT OFFICE 2,292,315

METHOD OF CURING STOCKS

Edward F. Christopher, Chicago, Ill., assignor to Industrial Patents Corporation, Chicago, Ill., a corporation of Delaware No Drawing. Application December 9, 1938, Serial No. 244,774

15 Claims. (Cl. 260—118)

This invention relates to a method of curing gelatinous material stock, such as hide trimmings, fleshings, sinews, and the like.

One of the objects of this invention is to provide a method of treating gelatinous material stock to yield a high test gelatinous material.

Another object of this invention is to provide a method of curing gelatinous material stock, such as hide trimmings, fleshings, sinews, and the like to shorten the curing period.

Another object of this invention is to provide a method of preserving gelatinous material stock against bacterial decomposition during shipment and before final treatment.

Further objects and advantages will become apparent from the description and claims which follow.

The present invention contemplates the treatment of gelatinous material stock, such as hide trimmings, fleshings, sinews, and the like with a solution of a water soluble salt of an alkaline earth metal followed by a treatment with an alkali.

The term "gelatinous material" is used herein and it is to be understood to designate all grades of animal gelatin and glue including those intermediate products commonly known as "low grade gelatin" and "high grade glue." The term "gelatinous material stock" is used herein and it is to be understood to designate animal waste matter such as snouts, lips, ears, hide trimmings, fleshings, sinews, and the like.

In the conventional practice of extracting gelatinous material from hide trimmings, the fresh trimmings are preserved by salting with sodium chloride. The salted material is stored or shipped to the glue factory and may there be stored until required for use. The salted stock must be washed thoroughly to free the stock from the salt before transferring the stock to the lime pits for curing. The curing period requires from four to twelve weeks, depending on the type of stock, the temperatures, and the amount of caustic which is generally employed to fortify the lime. The cured stock is then thoroughly washed and acidified to the correct pH, after which it is transferred to cooking vessels and the gelatinous material extracted with water.

I have discovered that the first step in my curing process also serves to preserve the stock. Fresh hide trimmings are placed in a solution of a water soluble alkaline earth metal salt and soaked for about twenty-four hours. The stock may then be removed and after draining, it may be stored and shipped. The absorbed salts serve as an effective preservative during the storage and shipping period. Small amounts of other preservatives, such as zinc chloride, may be added to the alkaline earth metal salt solution to further enhance the preservative effect.

The stored stock is washed with water to remove the excess quantities of soluble salts, after which the stock is covered with a dilute alkaline solution. The alkaline earth metal salts are preprecipitated in the stock itself by the alkaline solution and the stock may be cured in about four days soaking in the alkaline solution. After the curing period, the cured stock is washed to remove excess soluble alkali and is then acidified in the usual manner. The gelatin and glue may then be extracted in the usual manner by extraction with water.

The initial soaking or treatment with an aqueous solution of a soluble alkaline earth metal salt results in a thorough penetration of the salt into the stock. Because of the higher solubility of the salts employed, a more rapid and greater penetration of the metallic ion is secured than in the usual lime curing process since the lime is but slightly soluble in water. The alkali treatment results in a far more rapid precipitation of insoluble alkaline earth oxides or hydroxides in the stock than can be obtained by the use of a lime cure.

Suitable salts of alkaline earth metals are the salts of barium, calcium, and strontium. Calcium chloride and nitrate are particularly well suited for my invention because they are relatively inexpensive and have relatively high solubilities in water. Other water soluble calcium salts may be employed as well as the soluble salts of barium and strontium. The barium and strontium salts, however, are more expensive and in most cases are less soluble. Suitable alkalies for the curing step are ammonium hydroxide, caustic soda, and caustic potash.

The effect of the pretreatment with a soluble salt of an alkaline earth metal is proportional to the concentration of the salt solution in which the stock is soaked. I have found that calcium chloride is more effective in the treatment of gelatinous material stock than is calcium nitrate and may, therefore, be employed in lower concentrations. Because of the effect of the concentration on the glue stock my process permits the glue and gelatin maker to control the curing process more closely than is possible in the conventional lime curing method. The concentration of the alkaline earth metal salt may be adjusted to produce the desired effect on the particular type of stock being treated. By my method the curing period is reduced to five to six days.

Although any desired concentration of the alkaline earth metal salts may be employed, I prefer to employ solutions containing between 15 per cent and 25 per cent calcium salts. Solutions containing less than 10 per cent calcium salts require a greater curing period.

Hide trimmings comprising snouts, lips, and ears were soaked in a 20 per cent solution of calcium nitrate for a period of about twenty-four hours and then washed with water to remove the excess or surface salt. The washed stock was then cured in an 0.5 normal solution of caustic soda for a period of four days. The cured stock was then acidified to adjust the pH and the glue extracted with water in the usual manner. The average viscosity of glue prepared in this manner was 147 millipoises. This viscosity is exceedingly high for glue prepared from this type of stock. A solution containing 15 per cent calcium chloride may be substituted for the 20 per cent solution of calcium nitrate with similar results.

My process reduces the time of curing, hence reduces the storage space and curing pits which are ordinarily necessary in the manufacture of glue and gelatin from hide trimmings. The properties of glue and gelatin prepared from hide trimmings and the like by following the present method are superior to the properties of glue and gelatin prepared by the conventional methods. The reduction in the curing time apparently produces less degradation and chemical change in the glue and gelatin than is usual in the conventional methods.

I claim:

1. The method of preparing gelatinous material from gelatinous material stock which comprises treating the stock with an aqueous solution of a water soluble salt of an alkaline earth metal, separating the salt solution from the stock, treating the stock with a dilute aqueous solution of water soluble alkali, and thereafter extracting the gelatinous material from the treated stock.

2. The method of preparing gelatinous material from gelatinous material stock which comprises soaking the stock in an aqueous solution of a water soluble salt of an alkaline earth metal, separating the salt solution from the stock, treating the stock with a dilute aqueous solution of caustic soda, washing the treated stock, and thereafter extracting the gelatinous material from the treated stock.

3. The method of preparing gelatinous material from gelatinous material stock which comprises treating the stock with an aqueous solution of a water soluble calcium salt, separating the salt solution from the stock, treating the stock with a dilute aqueous solution of caustic soda, and thereafter extracting the gelatinous material from the treated stock.

4. The method of preparing gelatinous material from gelatinous material stock which comprises treating the stock with an aqueous solution of calcium chloride, separating the calcium chloride solution from the stock, treating the stock with a dilute aqueous solution of caustic soda, and thereafter extracting the gelatinous material from the treated stock.

5. The method of preparing gelatinous material from gelatinous material stock which comprises treating the stock with an aqueous solution of calcium nitrate, separating the calcium nitrate solution from the stock, treating the stock with a dilute aqueous solution of caustic soda, and thereafter extracting the gelatinous material from the treated stock.

6. The method of preparing gelatinous material from gelatinous material stock which comprises treating the stock with a 15 per cent to 20 per cent solution of a water soluble salt of an alkaline earth metal, separating the solution from the stock, treating the stock with a dilute solution of caustic soda, and thereafter extracting the gelatinous material from the treated stock.

7. The method of preparing gelatinous material from gelatinous material stock which comprises treating the stock with a 20 per cent solution of calcium nitrate, separating the solution from the stock, treating the stock with a 0.5 normal solution of caustic soda, and thereafter extracting the gelatinous material from the treated stock.

8. The method of curing gelatinous material stock for the extraction of gelatinous material which comprises soaking the stock in an aqueous solution of a water soluble salt of an alkaline earth metal and thereafter treating the stock with a dilute aqueous solution of water soluble alkali.

9. The method of curing gelatinous material stock for the extraction of gelatinous material which comprises soaking the stock in a 15 per cent to 25 per cent aqueous solution of an alkaline earth metal salt and thereafter treating the stock with a dilute aqueous solution of caustic alkali.

10. The method of curing gelatinous material stock for the extraction of gelatinous material which comprises soaking the stock in an aqueous solution of a water soluble calcium salt and thereafter treating the stock with a dilute aqueous solution of caustic soda.

11. The step in the method of curing gelatinous material stock for the extraction of gelatinous material which consists essentially of soaking the stock in an aqueous solution of a water soluble alkaline earth metal salt.

12. The step in the method of curing hide trimmings for the extraction of gelatinous material which consists essentially of soaking the hide trimmings in an aqueous solution of a water soluble calcium salt.

13. In a method of curing gelatinous material stock for the extraction of gelatinous material, the step which consists essentially of soaking the stock in an aqueous solution containing 15 per cent to 25 per cent water soluble calcium salts.

14. In a method of curing gelatinous material stock for the extraction of gelatinous material, the step which consists essentially of treating the stock with an aqueous solution of calcium chloride.

15. In a method of curing gelatinous material stock for the extraction of gelatinous material, the step which comprises treating the stock with an aqueous solution of calcium nitrate.

EDWARD F. CHRISTOPHER.